(12) United States Patent
Mo et al.

(10) Patent No.: US 8,077,227 B2
(45) Date of Patent: Dec. 13, 2011

(54) METHOD AND APPARATUS PROVIDING ANALOG ROW NOISE CORRECTION AND HOT PIXEL FILTERING

(75) Inventors: Yaowu Mo, Arcadia, CA (US); Chen Xu, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 894 days.

(21) Appl. No.: 12/114,354

(22) Filed: May 2, 2008

(65) Prior Publication Data

US 2009/0273691 A1    Nov. 5, 2009

(51) Int. Cl.
*H04N 9/64* (2006.01)
*H04N 5/217* (2011.01)

(52) U.S. Cl. .................................. 348/243; 348/241
(58) Field of Classification Search .................. 348/241, 348/243, 245
See application file for complete search history.

(56) References Cited

U.S. PATENT DOCUMENTS

| | | | |
|---|---|---|---|
| 6,067,113 A | 5/2000 | Hurwitz et al. | |
| 6,646,681 B1 | 11/2003 | Macy et al. | |
| 6,914,627 B1 | 7/2005 | Dong | |
| 7,205,522 B2 | 4/2007 | Krymski | |
| 7,292,276 B2 | 11/2007 | Egawa et al. | |
| 7,701,493 B2 * | 4/2010 | Mauritzson | 348/241 |
| 2002/0036700 A1 | 3/2002 | Merrill | |
| 2003/0001078 A1 | 1/2003 | Baharav et al. | |
| 2003/0231252 A1 | 12/2003 | Findlater et al. | |
| 2004/0135910 A1 | 7/2004 | Nam | |
| 2004/0263648 A1 | 12/2004 | Mouli | |
| 2005/0243193 A1 | 11/2005 | Gove et al. | |
| 2006/0109362 A1 | 5/2006 | Kim et al. | |
| 2006/0192864 A1 | 8/2006 | Mauritzson | |
| 2006/0243883 A1 | 11/2006 | Yahazu et al. | |
| 2006/0262204 A1 | 11/2006 | Dosluoglu | |
| 2006/0284998 A1 | 12/2006 | Park et al. | |
| 2007/0019085 A1 | 1/2007 | Suzuki | |
| 2007/0063127 A1 | 3/2007 | Bock | |
| 2007/0188642 A1 | 8/2007 | Agranov et al. | |
| 2007/0258000 A1 | 11/2007 | Kondo | |
| 2007/0290143 A1 | 12/2007 | Kameshima et al. | |
| 2008/0012966 A1 | 1/2008 | Beck et al. | |

FOREIGN PATENT DOCUMENTS

| | | |
|---|---|---|
| DE | 19860036 | 3/2000 |
| JP | 2001-045382 | 2/2001 |
| JP | 2006-128704 | 5/2006 |
| JP | 2007-150807 | 6/2007 |
| WO | WO-2008-018721 | 2/2008 |

OTHER PUBLICATIONS

Cho et al.; "A 1/2.5 inch 8.1Mpixel CMOS Image Sensor for Digital Cameras"; IEEE International Solid-State Circuits Conference; 2007; pp. 508, 509 and 618.
McIlrath et al.; "Design and Analysis of a 512×768 Current-Medicated Active Pixel Array Image Sensor"; IEEE Transactions on Electron Devices; vol. 44; No. 10; Oct. 1997; pp. 1706-1715.
Krymski et al.; "A 2 e Noise 1.3Megapixel CMOS Sensor"; Micron Imaging; Micron Technology, Inc.; pp. 1-6.

* cited by examiner

*Primary Examiner* — William Choi

(57) ABSTRACT

An imaging device and method for operating the device. The imaging device comprises a pixel array that comprises a plurality of imaging pixels and dark reference pixels arranged in columns and rows. The dark reference pixels produce a noise signal that is subtracted from a pixel signal produced by the imaging pixels to correct row noise. In addition, the imaging device may comprise a hot pixel filtering circuit that blocks the output from hot pixels.

16 Claims, 6 Drawing Sheets

METHOD AND APPARATUS PROVIDING ANALOG ROW NOISE CORRECTION AND HOT PIXEL FILTERING

FIELD OF THE INVENTION

Embodiments of the invention are directed to analog processing of signals for an imager device.

BACKGROUND OF THE INVENTION

Solid state imaging devices, including charge coupled devices (CCD), complementary metal oxide semiconductor (CMOS) imaging devices, and others, have been used in photo imaging applications. A solid state imaging device circuit includes a focal plane array of pixel cells or pixels as an imaging sensor, each cell including a photosensor, which may be a photogate, photoconductor, a photodiode, or other photosensor having a doped region for accumulating photo-generated charge. For CMOS imaging devices, each pixel has a charge storage region, formed on or in the substrate, which is connected to the gate of an output transistor, typically a source follower transistor, which is part of a readout circuit. The charge storage region may be constructed as a floating diffusion region. In some CMOS imaging devices, each pixel may further include at least one electronic device such as a transistor for transferring charge from the photosensor to the storage region and one device, also typically a transistor, for resetting the storage region to a predetermined charge level prior to charge transference. A row select transistor may also be employed to gate the pixel output.

In a CMOS imaging device, the active elements of a pixel perform the necessary functions of: (1) photon to charge conversion; (2) accumulation of image charge; (3) resetting the storage region to a known state; (4) storage of charge in the storage region: (5) selection of a pixel for readout; and (6) output and amplification of a signal representing pixel charge. Photo charge may be amplified when it moves from the initial charge accumulation region to the storage region.

CMOS imaging devices of the type discussed above are generally known as discussed, for example, in U.S. Pat. Nos. 6,140,630, 6,376,868, 6,310,366, 6,326,652, 6,204,524, and 6,333,205, assigned to Micron Technology, Inc.

Ideally, the digital images created by a CMOS imaging device are exact duplications of the light image projected upon the device's pixel array. That is, for a flat-field image, all of the imaging pixel signals should have the same signal value. However, various noise sources can affect individual pixel outputs and thus distort the resulting digital image. As CMOS pixel arrays increase in size to obtain higher resolution, the physical non-uniformity of the arrays becomes more prominent. One issue is the signal variation between rows that can result in vertical shading.

One known solution is to include in the array dark reference pixels that are light-shielded to determine the noise in each row. Because the dark reference pixels are light shielded, and therefore optically black, all voltage that is output by the pixels is generated by noise and not by light. The noise signals received from the dark reference pixels for a given row are averaged and used in the digital domain to remove noise from the image signals output from the row.

The above solution to row noise may be adversely affected by what is known as "hot" pixels. A hot pixel is a pixel that appears bright when it is supposed to be completely dark black. Hot pixels are typically caused by process defects such as e.g., silicon defects, metallic contamination, stress, etc. When one or more of the reference pixels contain hot pixels, the row noise correction can introduce a correction offset that is not truly representative of the row noise. That is, the values of the hot reference pixels adversely affect the row noise compensation average discussed above: this improper average will cause an incorrect compensation offset to be applied to the image pixels in that row, causing the entire row of image pixels to have inaccurate values. Methods for filtering hot pixels exist, but current methods involve filtering hot pixels in the digital domain (i.e., after pixel signals have been converted from analog to digital) or involve using dark reference pixels with a different electronic structure than the imaging pixels.

Noise correction and or hot pixel filtering in the digital domain suffers from a lack of accuracy because other noise is introduced between the analog pixel and the digital processing circuits that make row noise correction and/or hot pixel filtering less accurate. To address the above limitation of the digital row noise correction, a method and apparatus for row noise correction and hot pixel filtering in the analog domain (i.e., prior to digital conversion) is provided. Furthermore, compared to its digital domain counterpart, analog row noise correction has the advantage of smaller die size, greater accuracy and faster readout speed.

DETAILED DESCRIPTION OF THE INVENTION

Method and apparatus embodiments described herein remove row noise and filter out hot pixels in the analog domain. Performing these functions in the analog domain allows imaging dies to be smaller and image processing to be faster and more accurate.

Imaging dies can be smaller because less dark reference pixels are required to accurately correct row noise in the analog domain (since row noise correction in the digital domain requires more dark references pixels to maintain accuracy because additional noise and signal modification is introduced during analog-to-digital conversion and subsequent processing). In addition, correcting row noise before analog gain reduces the number of dark reference pixels needed because row noise correction can be done independent of pixel color.

Image processing can be faster because row noise correction occurs during pixel sampling and the readout time is independent of the number of dark reference pixels. Image processing can also be more accurate because row noise correction can occur before other noise and signal modification is introduced, thus allowing row noise to be more effectively identified and removed.

Figure 1:
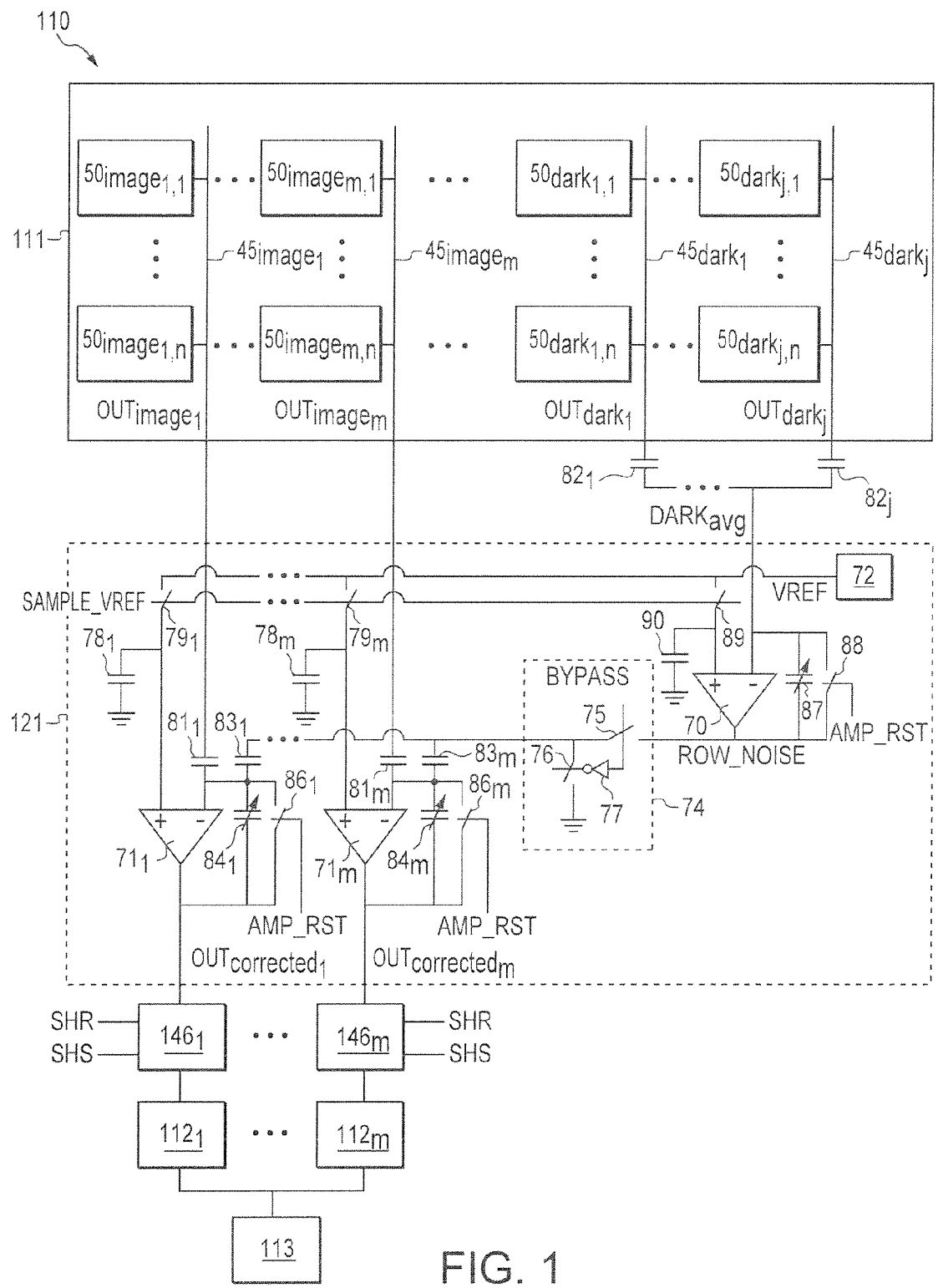
FIG. 1 is a diagram of a portion of an imager according to an embodiment described herein.

Now referring to the drawings, where like reference numbers represent like components and/or signals, FIG. 1 shows a portion of an imager 110 having a pixel array 111, row noise correction portion 121, sample and hold circuits 146, differential amplifiers 112 and an analog-to-digital converter 113. Pixel array 111 has image pixels (collectively referred to as image pixels $50_{image}$) and dark reference pixels (collectively referred to as dark reference pixels $50_{dark}$) arranged in rows and columns. Each column of image pixels $50_{image}$ is coupled to a respective image column line $45_{image}$ and each column of dark reference pixels $50_{dark}$ is coupled to a respective dark column line $45_{dark}$. Pixel array 111 has m columns of image pixels $50_{image}$, j columns of dark references pixels $50_{dark}$ and n rows of image pixels $50_{image}$ and dark references pixels $50_{dark}$. Thus, FIG. 1 uses the notations $50_{image_{1,1}}, \ldots, 50_{image_{m,n}}$ to represent the image pixels, $50_{dark_{1,1}}, \ldots, 50_{dark_{j,n}}$ to represent the dark reference pixels, $45_{image_1}, \ldots, 45_{image_m}$ to represent the image column lines and $45_{dark_1}, \ldots, 45_{dark_j}$ to represent the dark column lines.

Figure 2:
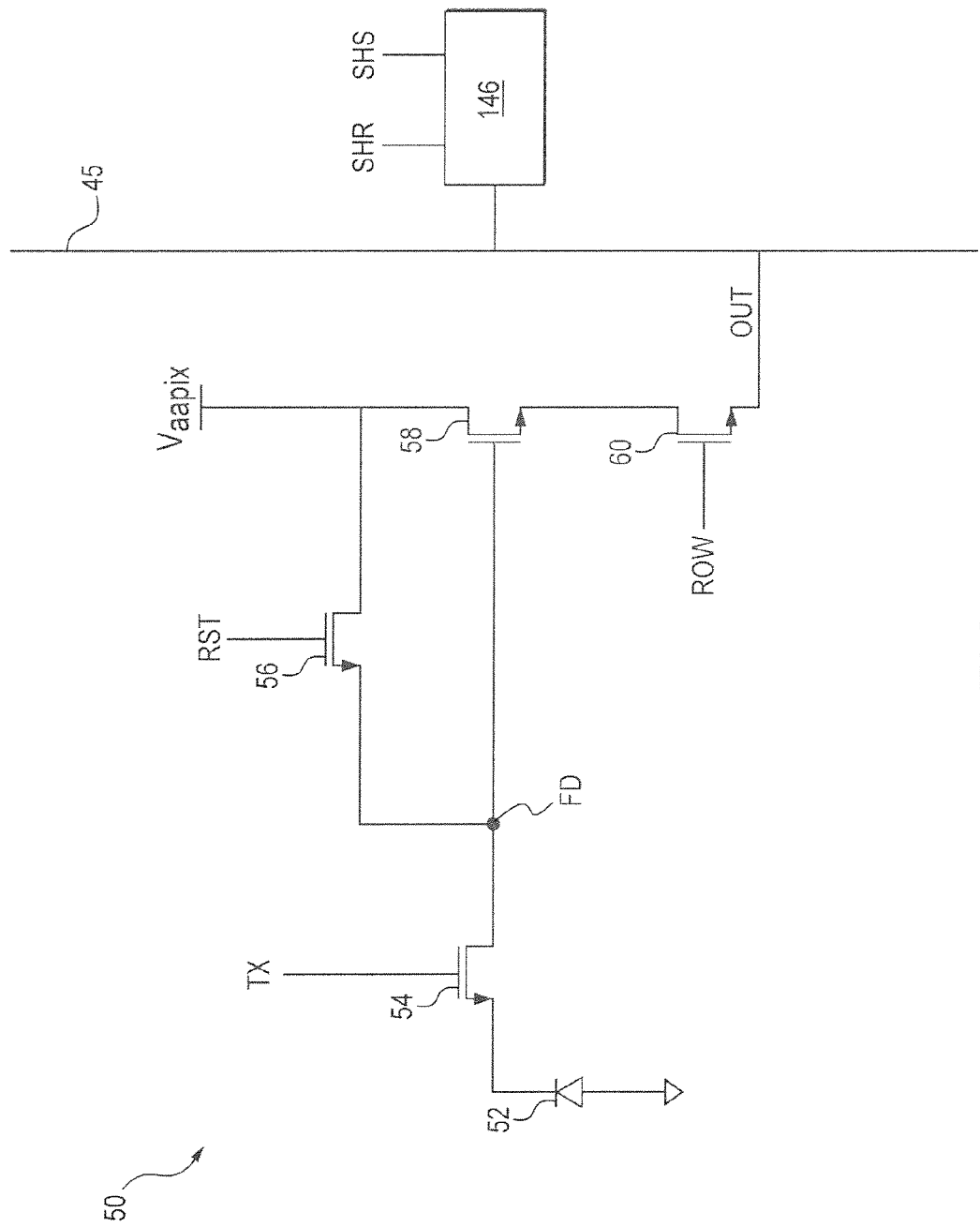
FIG. 2 is a diagram of a portion of an imager according to an embodiment described herein.

It should be understood that each row in the pixel array 111 may have both image pixels $50_{image}$ and dark reference pixels $50_{dark}$. An example four-transistor pixel which may be used for the pixels 50 is shown in FIG. 2 and described in greater detail below. It should be noted that the invention is not limited to use with four-transistor pixels, as other pixel circuits having other numbers of transistors may also be used. Dark reference pixels $50_{dark}$ may have the same circuitry as image pixels $50_{image}$ and may be light-shielded or otherwise optically black. For purposes of clarity, the reference number 50 will be used when referring generally to both image pixels $50_{image}$ and dark reference pixels $50_{dark}$.

Referring again to FIG. 1, row noise correction circuit 121 has a column amplifier $71_1, \ldots, 71_m$ for each image column line $45_{image}$ (collectively amplifiers 71) and a single row noise amplifier 70. The negative terminal connection of the row noise amplifier 70 is coupled to all of the dark column lines $45_{dark}$. The negative terminal connection of each column amplifier 71 is coupled to the respective image column line $45_{image}$ and the output of the row noise amplifier 70. For example, amplifier $71_1$ is connected to image column line $45_{image_1}$ (through capacitor $81_1$). Row noise correction circuit 121 also has a reference voltage generator 72 that is coupled to the positive terminal connection of each column amplifier 71 and the positive terminal connection of the row noise amplifier 70.

A programmable capacitor 87 is connected in parallel with a reset switch 88, which connects the output of the row noise amplifier 70 to the negative terminal connection of the row noise amplifier 70. Switch 89 switchably couples the reference voltage generator 72 to the positive terminal connection of the row noise amplifier 70. Capacitor 90 couples a ground potential to the positive terminal connection of the row noise amplifier 70 at a point between switch 89 and the positive terminal connection of the row noise amplifier 70.

A bypass circuit 74 is connected between the row noise amplifier 70 output and the negative terminal connection of the column amplifiers 71. The bypass circuit 74 has a first switch 75 whose first terminal is coupled to the output of the row noise amplifier 70 and whose second terminal is coupled to the negative terminal connections of the column amplifiers 71. A second switch 76 has a first terminal coupled to a ground potential and a second terminal coupled to the second terminal of the first switch 75. Both switches 75, 76 are controlled by the bypass select signal BYPASS, whereby the bypass select signal BYPASS is inverted by inverter 77 before controlling the second switch 76. It is to be understood that the bypass circuit 74 is not a necessary feature of the embodiment and can be omitted, which is why it is shown using a dashed-box (discussed below in more detail).

A respective capacitor 81 is connected between each image column line $45_{image}$ and the negative terminal connections of the respective column amplifiers 71. A programmable capacitor 82 is connected between a respective dark column line $45_{dark}$ and the point that the dark column lines $45_{dark}$ are coupled together. A capacitor 83 is coupled between the bypass circuit 74 and the negative terminal connection of a respective column amplifier 71. Programmable capacitors 84 are connected in parallel with reset switches 86, which connect the output of each column amplifier 71 to respective capacitors 81, 83 and the negative terminal connection of the respective column amplifier 71. In a preferred embodiments capacitors 81, 82 and 83 have the same capacitance but the capacitance of programmable capacitors 82 can be adjusted to more accurately correlate the image pixels $50_{image}$ and dark reference pixels $50_{dark}$.

Switches 79 switchably couple the output of the reference voltage generator 72 to the positive terminal connections of column amplifiers 71. Capacitors 78 couple a ground potential to the positive terminal connection of each of the column amplifiers 71 at a point between the respective switch 79 and the column amplifier 71.

Each image column line $45_{image}$ carries a pixel signal $OUT_{image}$ from image pixels $50_{image}$ in an associated column to the negative terminal connection of the respective column amplifier 71. Each dark column line $45_{dark}$ carries a dark reference pixel signal $OUT_{dark}$ from each dark reference pixel $50_{dark}$ to a respective programmable capacitor 82. All dark column lines $45_{dark}$ are coupled together averaging each dark reference pixel signal $OUT_{dark}$ and thus inputting an average dark signal $DARK_{avg}$ to the negative terminal connection of the row noise amplifier 70. A reference voltage VREF output by the reference voltage generator 72 is stored on each capacitor 78 when a respective switch 79 is closed and stored on capacitor 90 when switch 89 is closed. The reference voltage remains available in each capacitor 78 and the capacitor 90 as an input to the positive terminal connection of each column amplifier 71 and row noise amplifier 70, respectively. Row noise amplifier 70 subtracts the average dark pixel signal $DARK_{avg}$ from the reference voltage VREF and outputs a row noise signal ROW_NOISE that is inversely proportional to the average dark pixel signal $DARK_{avg}$.

The row noise signal ROW_NOISE from the row noise amplifier 70 is added to the pixel signals $OUT_{image}$ at the negative input of the column amplifiers 71. Because the row noise signal ROW_NOISE is inversely proportional to the average dark pixel signal $DARK_{avg}$, adding the row noise signal ROW_NOISE to the pixel signals $OUT_{image}$ connected to the column amplifiers 71 effectively subtracts the average dark pixel signal $DARK_{avg}$ from the pixel signals $OUT_{image}$. The result of this operation is input to the column amplifier 71 to be subtracted from the reference voltage VREF. The noise corrected pixel signal $OUT_{corrected}$ output from each column amplifier 71 is transferred to a respective sample and hold circuit 146, amplified by the differential amplifier 112 and converted to a digital signal by the analog-to-digital converter 113.

The bypass circuit 74 allows the image column lines $45_{image}$ to be read out without row noise correction being performed, thereby allowing row noise correction to occur in a different circuit or not at all. The bypass circuit 74 is not required if row noise correction is always to be performed by row noise correction circuit 121. When bypass select signal BYPASS is activated, the first switch 75 opens decoupling the output of the row noise amplifier 70 from the column amplifiers 71. Furthermore, the bypass select signal BYPASS is inverted by inverter 77 that closes the second switch 76. By closing second switch 76, a ground potential is coupled to the column amplifiers.

Reference voltage VREF is sampled at capacitors 78, 90 to reduce any interference during pixel sampling. Switches 79 and 89, controlled by SAMPLE_VREF, are closed to allow VREF to be sampled.

Activating amplifier reset signal AMP_RST closes switches 86 and 88, which resets the amplifiers 70, 71. Programmable capacitors 84, 87 adjustably control the gain of amplifiers 70, 71. Preferably, row noise amplifier 70 has a voltage gain greater than two to reduce the capacitor size, total power consumption, and noise injection from the digital path crosstalk.

FIG. 2 illustrates a typical four-transistor pixel 50. The pixel 50 includes a photosensor 52 (e.g., photodiode, photogate, etc.), transfer transistor 54, a storage node configured as a floating diffusion region FD, reset transistor 56, source follower transistor 58 and row select transistor 60. The photosensor 52 is connected to the floating diffusion region FD by the transfer transistor 54 when the transfer transistor 54 is activated by a transfer select signal TX. The reset transistor 56 is connected between the floating diffusion region FD and an array pixel supply voltage $V_{aapix}$. A reset select signal RST activates the reset transistor 56, which resets the floating diffusion region FD to a known state as is known in the art.

The source follower transistor 58 has its gate connected to the floating diffusion region FD and is connected between the array pixel supply voltage $V_{aapix}$ and the row select transistor 60. The source follower transistor 58 converts the charge stored at the floating diffusion region N into an electrical output signal. The row select transistor 60 is controllable by a row select signal ROW for selectively outputting the output signal OUT from the source follower transistor 58 to sample and hold circuit 146 via column line 45. For each pixel 50, two output signals are conventionally generated, one being a reset signal $V_{rst}$ generated after the floating diffusion region FD is reset, the other being an image or photo signal $V_{sig}$ generated after charges are transferred from the photosensor 52 to the floating diffusion region FD. Output signals $V_{rst}$, $V_{sig}$ are selectively stored in the sample and hold circuit 146 based on reset and pixel sample and hold select signals SHR, SHS. For the dark reference pixels $45_{dark}$, the photo signal $V_{sig}$ should represent a dark or black signal due to the light-shielding.

Figure 3:
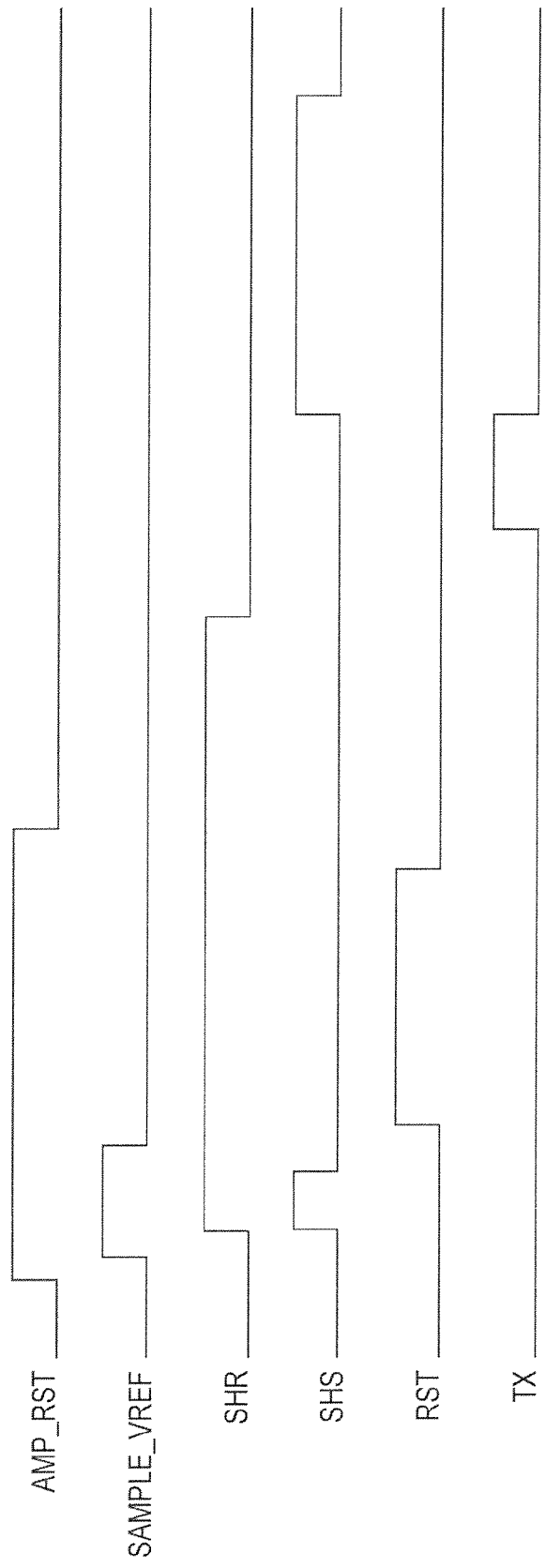
FIG. 3 is a timing diagram for operation of an imager according to an embodiment described herein.

FIG. 3 shows one possible timing diagram for operating pixel array 111 and row noise correction circuit 121. First, the amplifier reset select signal AMP_RST is activated, closing switches 86 and 88 to reset amplifiers 71 and 70, respectively. Second, reference voltage sample select signal SAMPLE_VREF is activated, closing switches 79 and 89 and sampling VREF on capacitors 78 and 90, respectively. Then, reset sample and hold select signal SHR is activated and pixel sample and hold select signal SHS is pulsed to reset the capacitors (not shown) in the sample and hold circuit 146. Finally, pixel reset signal RST is pulsed to reset the floating diffusion region FD as is known in the art.

The pixel 50 then undergoes correlated double sampling (CDS). On the falling edge of the reset sample and hold select signal SHR, a pixel reset signal $V_{rst}$ is sampled by the sample and hold circuit 146. Next, transfer select signal TX is pulsed transferring charge from the photodiode 52 to the floating diffusion region FD. Then, SHS is again activated and the pixel photo signal $V_{sig}$ is sampled by the sample and hold circuit 146 on the falling of the pixel sample and hold select signal SHS.

While FIG. 3 is one possible timing diagram for operating pixel array 111 and row noise correction circuit 121, in a preferred embodiment, reference voltage sample select signal SAMPLE_VREF is only active when amplifier reset select signal AMP_RST is active to reduce the impact on the reading out the pixel signals $V_{rst}$, $V_{sig}$ caused by sampling the reference voltage VREF. It is to be understood the that timing in FIG. 3 is only an example of a possible timing for operating pixel array 111, and that other timings are possible as well.

Figure 4:
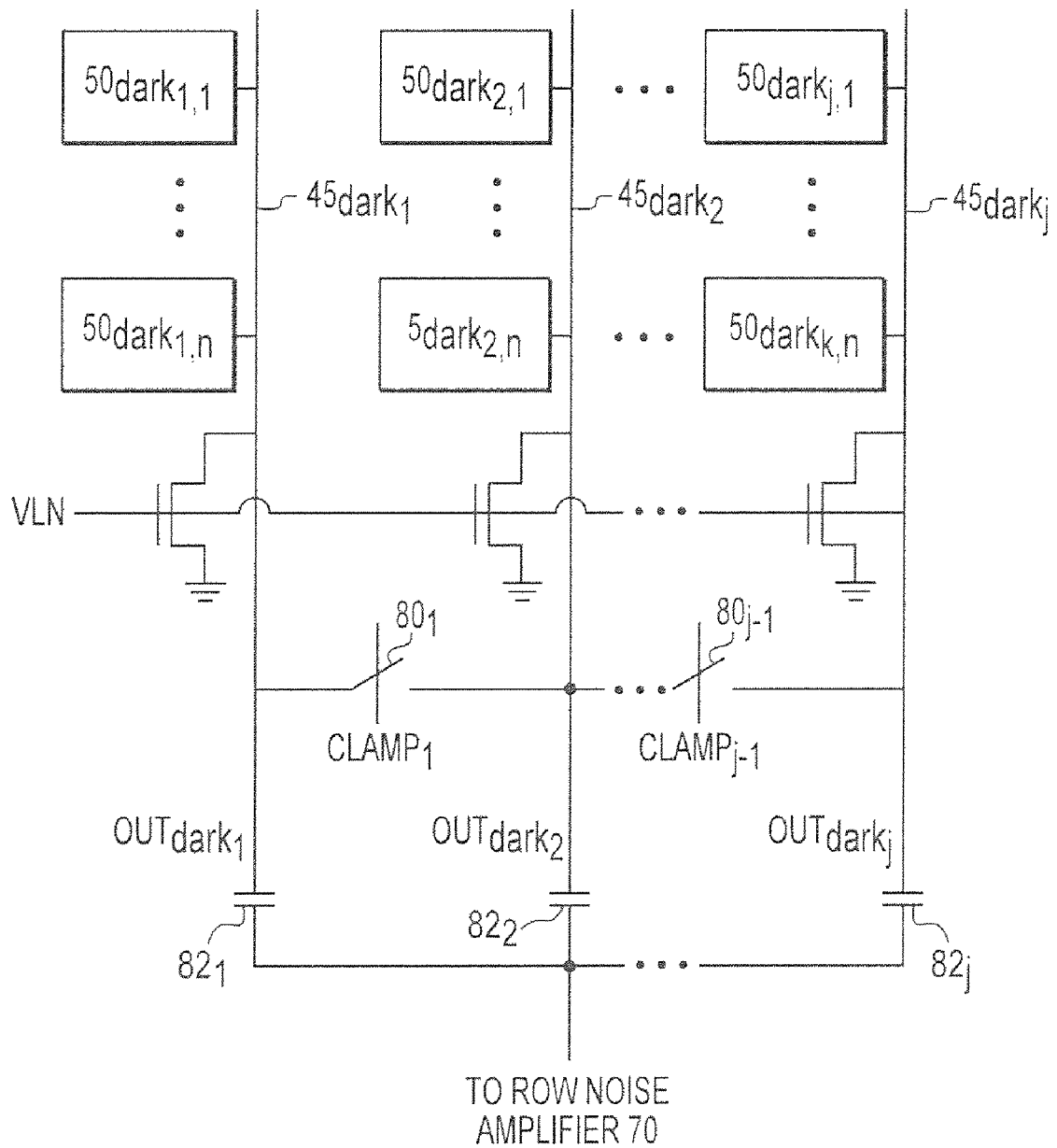
FIG. 4 is a diagram of a portion of an imager according to an embodiment described herein.

FIG. 4 illustrates a method and apparatus for hot pixel filtering. All dark column lines $45_{dark}$ are coupled to other dark column lines $45_{dark}$ by respective switches 80. Dark column lines $45_{dark}$ need not be coupled to adjacent dark column lines $45_{dark}$, but can be coupled to any other dark column line or lines $45_{dark}$. In the example shown in FIG. 4, pixel $50_{dark_{1,1}}$ is a representative hot pixel, and the other pixels $50_{dark_{2,1}}$, $50_{dark_{j,1}}$ in row 1 are not. As noted earlier, pixels $50_{dark}$ may have any pixel circuitry known in the art, but pixel 50 (FIG. 2) will be referred to below for purposes of explanation.

When TX (FIG. 2) is activated, the signal on the floating diffusion region FD (FIG. 2) of the hot pixel $50_{dark_{1,1}}$ will be discharged to a lower level than pixel $50_{dark_{1,2}}$ due to the abnormally high dark current in hot pixel $50_{dark_{1,1}}$. As a result, the output of hot pixel $50_{dark_{1,1}}$ will be lower than the output of the pixel $50_{dark_{1,2}}$ when the photo signals $V_{sig}$ are read out from row 1.

When the clamp select signal CLAMP is activated and switch $80_1$ is closed, the output voltages $OUT_{dark}$ from pixels $50_{dark_{1,1}}$, $50_{dark_{1,2}}$ are averaged, thus changing the source voltage of the source follower transistors 58 (FIG. 2) of the pixels $50_{dark_{1,2}}$, $50_{dark_{1,1}}$. Specifically, the gate to source voltage of source follower transistor 58 (FIG. 2) of pixel $50_{dark_{1,1}}$ is decreased and the gate to source voltage of the source follower transistor 58 (FIG. 2) of pixel $50_{dark_{1,2}}$ is increased. If the gate to source voltage of the source follower transistor 58 (FIG. 2) of pixel $50_{dark_{1,1}}$ is lower than a cut-off point that is the sum of the threshold voltage of the source follower transistor 58 (FIG. 2) of pixel $50_{dark_{1,1}}$ and the average of the output voltages $OUT_{dark}$, source follower transistor 58 (FIG. 2) of pixel $50_{dark_{1,1}}$ will, not transfer a voltage to row transistor 60 (FIG. 2). The cut-off point can be adjusted through the column line bias circuit VLN circuitry.

Clamping switches $80_1$ through $80_n$ can be closed in any desired pattern. Closing every other switch 80 (i.e., $80_1$ closed, $80_2$ open, $80_3$ closed, $80_4$ open, etc.) clamps two pixels $50_{dark}$ together and will allow for the greatest accuracy, resolution and image quality, but has the least protection from hot pixels because two hot pixels clamped together will not filter out a hot pixel. Closing switches 80 in larger groups, for example, groups of 6 (one switch open, six consecutive switches closed, one switch open, 6 consecutive switches closed, etc), provides more protection from hot pixels, but suffers from reduced accuracy, resolution and image quality. Regardless of the pattern, clamping switches 80 that are to be closed must be closed before pixel signal readout, but preferably are always closed to reduce crosstalk.

It is to be understood that embodiments described herein contemplate dark reference pixels $50_{dark}$ on both sides of a pixel array 111, especially on higher resolution pixel arrays (e.g., >8 megapixel), with one row noise amplifier 70 for each side of the pixel array 111. In such an embodiment, capacitors 81 and 82 may have the same capacitance and capacitor 83 may have a capacitance equal to one half the capacitance of capacitors 81, 82. Embodiments described herein also contemplate additional circuitry between row noise correction circuit 121 and the sample and hold circuits 146. Such additional circuitry can include, but is not limited to, programmable gain amplifiers.

Figure 5:
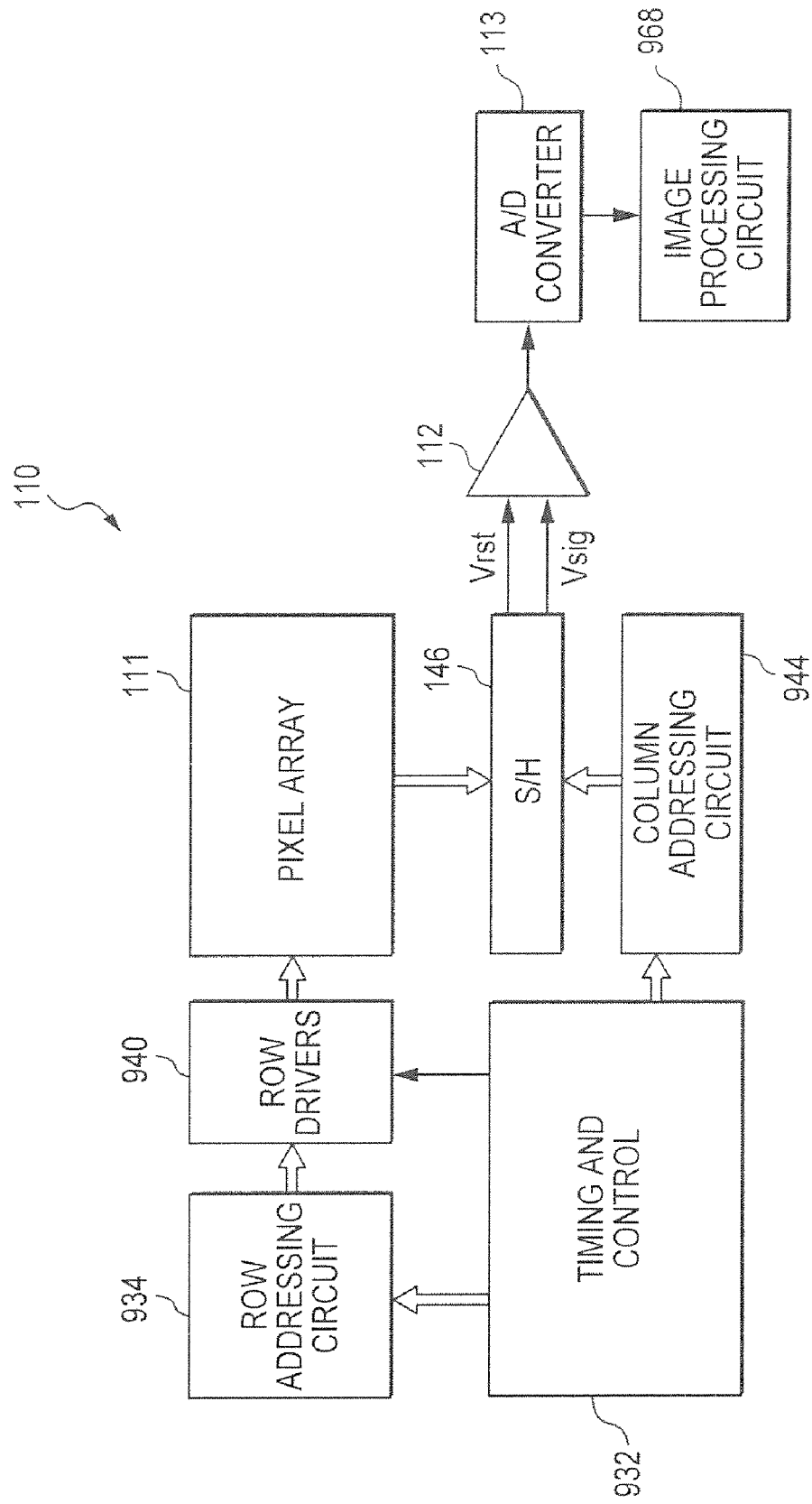
FIG. 5 is a diagram of an imager according to an embodiment described herein.

FIG. 5 illustrates a block diagram of an example CMOS imager 110 having a pixel array 111 being constructed in accordance with one of the embodiments described above.

Pixel array 111 comprises a plurality of pixels 50 (FIGS. 1, 2 and 4) arranged in a predetermined number of columns and rows. The pixels of each row in array 111 are operated by row select lines, and the pixels of each column are selectively output by respective column select lines 45 (FIGS. 1, 2 and 4). A plurality of row and column lines 45 (FIGS. 1, 2 and 4) are provided for the entire array 111. The row lines are selectively activated by a row driver 940 in response to row address circuit 934. The column select lines are selectively activated by a column addressing circuit 944. Thus, a row and column address is provided for each pixel 50 (FIGS. 1, 2 and 4). The pixel signals $V_{rst}$, $V_{sig}$ read out from each pixel 50 (FIGS. 1, 2 and 4) are subtracted in differential amplifier 112 and are converted to digital signals by analog-to-digital converter 113 which supplies the digital signal to an image processing circuit 968 which processes each pixel signal and forms an image which can be displayed, stored or output.

A timing and control circuit 932 provides timing and control signals for enabling the reading out of signals from pixels of the pixel array 111 in a manner commonly known to those skilled in the art. The timing and control circuit 932 selects a particular row of pixels in the pixel array 111 by controlling the operation of a row addressing circuit 934 and row drivers 940. The timing and control circuit 932 may also provide other control signals, for example, AMP_RESET. CLAMP, BYPASS and SAMPLE_VREF.

Figure 6:
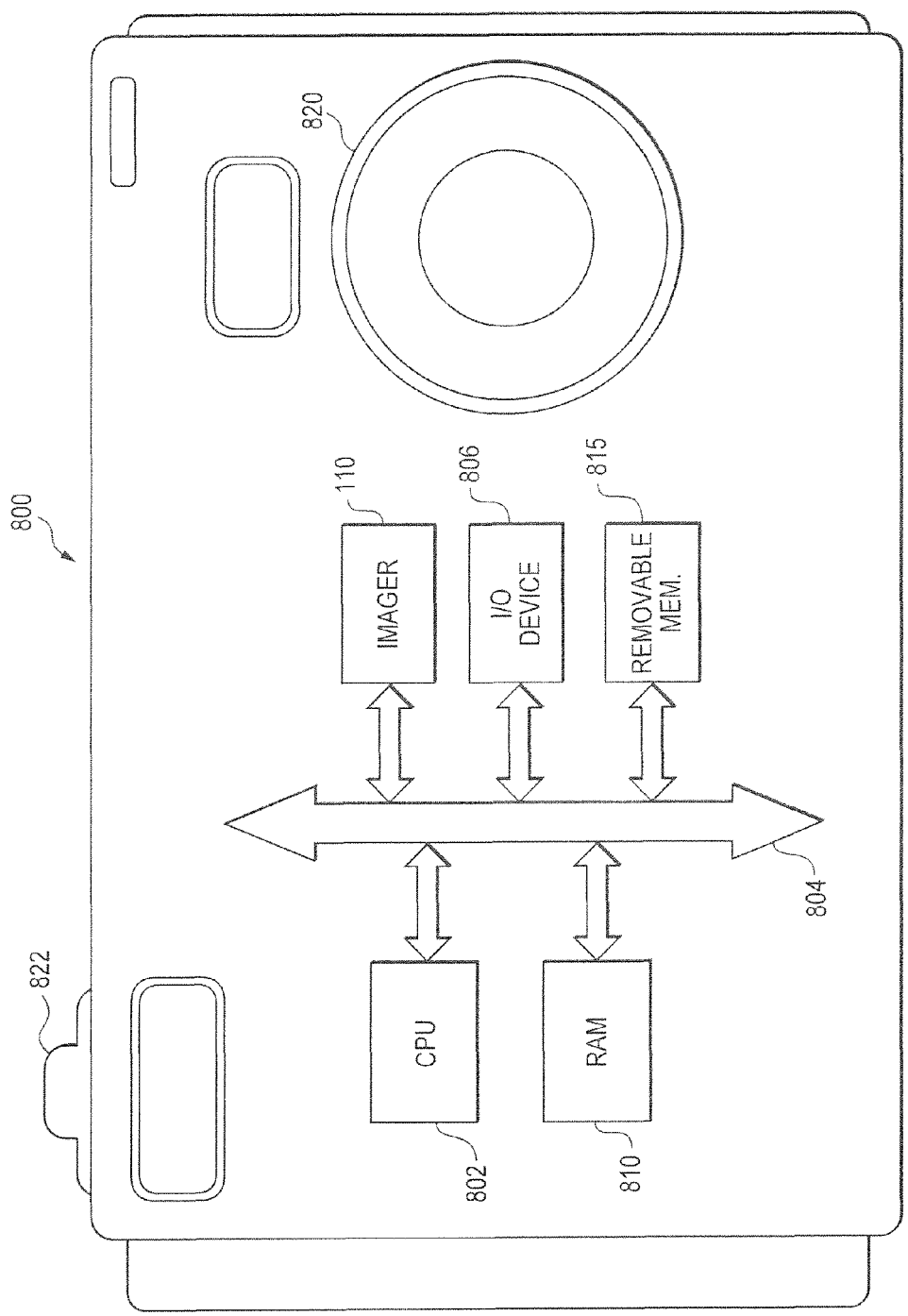
FIG. 6 is a block diagram of a processor system according to an embodiment described herein.

FIG. 6 shows a typical system 800 modified to include an imager 110 constructed and operated in accordance with an embodiment. The system 800 is a system having digital circuits that could include imaging devices. Without being limiting, such a system could include a computer system, camera system, scanner, machine vision, vehicle navigation, video phone, surveillance system, auto focus system, star tracker system, motion detection system, image stabilization system, or other image acquisition system.

System 800, for example a digital still or video camera system, generally comprises a central processing unit (CPU) 802, such as a control circuit or microprocessor for conducting camera functions, that communicates with one or more input/output (I/O) devices 806 over a bus 804. Imaging device 110 also communicates with the CPU 802 over the bus 804. The system 800 also includes random access memory (RAM) 810, and can include removable memory 815, such as flash memory, which also communicates with the CPU 802 over the bus 804. The imaging device 110 may be combined with the CPU processor with or without memory storage on a single integrated circuit or on a different chip than the CPU processor. In a camera system, a lens 820 is used to focus light onto the pixel array 111 (FIG. 1) of the imaging device 110 when a shutter release button 822 is pressed.

The above description and drawings are only to be considered illustrative of specific embodiments, which achieve the features and advantages described herein. Modification and substitutions to specific structures can be made. Accordingly, the invention is not to be considered as being limited by the foregoing description and drawings, but is only limited by the scope of the appended claims.

What is claimed as new and desired to be protected by Letters Patent of the United States is:

1. An imaging device comprising:
    a pixel array comprising:
        a plurality of image pixels arranged in columns and rows, each column of image pixels in the array comprising an image column line for receiving pixel signals from the image pixels in the column,
        a row noise correction circuit for removing row noise from the image pixel signals received from each column line to produce noise-corrected pixel signals, and
        a plurality of dark reference pixels arranged in each row of image pixels; and
    a plurality of sample and hold circuits for storing the noise-corrected pixel signals received from the row noise correction circuit.

2. The imaging device of claim 1, wherein the row noise correction circuit comprises a circuit for averaging signals received from the dark reference pixels to create an average signal and combining the average signal with the image pixel signals received from the imaging signals.

3. The imaging device of claim 2, wherein the circuit for averaging the row noise correction circuit further comprises:
    a reference voltage generator for supplying a reference voltage;
    a row noise amplifier for receiving a row noise signal from a plurality of reference pixels and the reference voltage, and supplying an amplified row noise signal;
    a plurality of signal addition circuits for adding the amplified row noise signal to the pixel signals to produce an added signal; and
    a plurality of column amplifiers for receiving the added signal and the reference voltage and supplying a noise-corrected pixel signal to the sample and hold circuit.

4. The imaging device of claim 3, further comprising at least one reference voltage storage circuit for sampling the reference voltage, the at least one reference voltage storage circuit being coupled to the column line and comprising:
    a sampling capacitor for storing a sampled reference voltage; and
    a sampling switch for selectively storing the reference voltage and supplying the reference voltage to one of the plurality of column amplifiers.

5. The imaging device of claim 3, further comprising a reference voltage storage circuit for sampling the reference voltage and supplying the reference voltage to the row noise amplifier, the reference voltage circuit comprising:
    a sampling capacitor for storing a sampled reference voltage; and
    a sampling switch for selectively storing the reference voltage and supplying the reference voltage to the row noise amplifier.

6. The imaging device of claim 3, further comprising at least one programmable capacitor coupled to the input and output of at least one of the plurality of column amplifiers for adjusting the gain on the at least one of the plurality of column amplifiers.

7. The imaging device of claim 3, further comprising a programmable capacitor coupled to the input and output of the row noise amplifier for adjusting the gain on row noise amplifier.

8. The imaging device of claim 3, further comprising at least one amplifier reset switch switchably coupling the output of at least one of the plurality of column amplifiers to the input of the at least one of the plurality of column amplifiers.

9. The imaging device of claim 3, further comprising:
    an amplifier reset switch switchably coupling the output of the row noise amplifier to the input of the row noise amplifier.

10. The imaging device of claim 2, wherein at least one of the plurality of dark reference pixels is light shielded.

11. The imaging device of claim 2, further comprising a bypass circuit for selectively preventing the row noise correction circuit from removing row noise from the pixel signals.

12. The imaging device of claim 11, wherein the bypass circuit comprises:
   a first bypass switch for switchably grounding the amplified row noise signal;
   a second bypass switch for switchably coupling the first bypass switch to the output of the row noise amplifier;
   a bypass select line providing a bypass control signal that opens the second switch; and
   an inverter for inverting the bypass select signal to close the first switch when the second switch is open.

13. A method of operating a pixel array comprising:
   transferring at least one pixel signal from at least one imaging pixel to at least one column line;
   determining a noise signal from a plurality of optically black pixels;
   correcting row noise in the at least one pixel signal by combining the noise signal with the at least one pixel signal to create a noise-corrected pixel signal; and
   transferring the noise-corrected pixel signal to at least one sample and hold circuit.

14. The method of claim 13, wherein the step of determining a noise signal comprises:
   averaging a plurality of pixel noise signals from the plurality of optically black pixels to obtain an average noise signal; and
   subtracting the average noise signal from a reference voltage to obtain the noise signal.

15. The method of claim 14, further comprising storing the reference voltage in a plurality of reference voltage storage capacitors.

16. The method of claim 13, wherein the step of correcting row noise comprises:
   adding the noise signal to the at least one pixel signal to obtain a combined pixel signal;
   subtracting the combined pixel signal from the reference voltage to obtain a noise-corrected pixel signal; and
   transferring the noise-corrected pixel signal to the at least one sample and hold circuit.

\* \* \* \* \*